Nov. 18, 1969   TAKAJI FUNAHASHI   3,479,122
WRITING INSTRUMENT
Filed Feb. 21, 1968

INVENTOR
TAKAJI FUNAHASHI

BY *Wenderoth, Lind & Ponack*
ATTORNEYS 3,479,122
WRITING INSTRUMENT
Takaji Funahashi, 1, 2-chome, Kitatakajo-machi,
Nishi-ku, Nagoya, Japan
Filed Feb. 21, 1968, Ser. No. 707,177
Claims priority, application Japan, Mar. 14, 1967,
42/21,629
Int. Cl. B43k 5/14
U.S. Cl. 401—199                    1 Claim

ABSTRACT OF THE DISCLOSURE

The disclosed writing instrument comprises a hollow pen holder, and an ink cartridge having a pen tip integral with the holder and a capillary structure disposed between the pen tip and the cartridge to control an amount of ink supplied from the cartridge to the pen tip. In the assembled state, the pen tip slightly projects beyond one end of the holder and the cartridge extends from the other end of the holder to close that end. When the cartridge is empty, a fresh cartridge including the associated pen tip can be substituted for the empty one.

---

This invention relates to improvements in a writing instrument of the type including a thin rod-shaped pen tip and a reservoir of ink.

The conventional writing instruments of the type referred to generally include a quantity of ink stored in an ink bearing material such as felt or the like disposed within the associated holder and a thin rod-shaped pen tip having one end portion contacting the ink bearing material to be supplied with the ink slowly flowing out from the ink bearing material. Such writing instruments are generally of two kinds one of which cannot be replenished with ink and an exchangeable pin tip and the other of which can be replenished. In the latter kind of writing instruments, however, the replenishment of ink and exchange of the pen tip requires much effort. Therefore they can not continue to be used for writing purposes until they are forced to be discarded as a result of which they do not give long service.

Accordingly, it is an object of the invention to provide an improved useful writing instrument of the type which replenishment of ink and exchange of its pen tip is accomplished in a simple manner.

Briefly, the invention accomplishes this object by the provision of a writing instrument comprising a hollow pen holder including a hole therethrough, and an assembly of pen tip and ink reservoir detachably fitted into said hole, said assembly being a unitary structure and including a thin rod-shaped pen tip, a tip holder for holding said pen tip and an ink reservoir in the named order, said tip holder having capillary means disposed therein between said pen tip and said ink reservoir to contact them to control the amount of ink supplied from said reservoir to said pen tip, the arrangement being such that when the assembly is put in place within the hollow holder member, said pen tip slightly projects beyond one end of said holder member while said ink reservoir has one end portion extending from the other end of said holder member to close that end.

Figure 1:
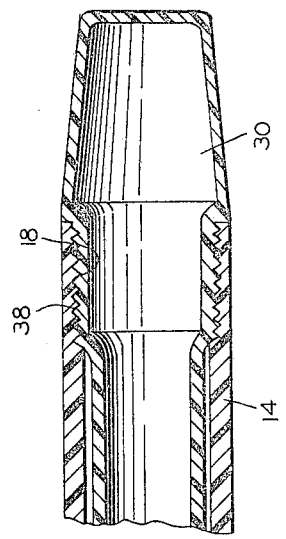
Figure 1:
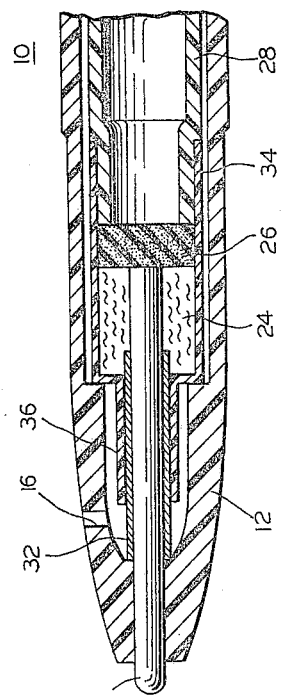
Figure 2:
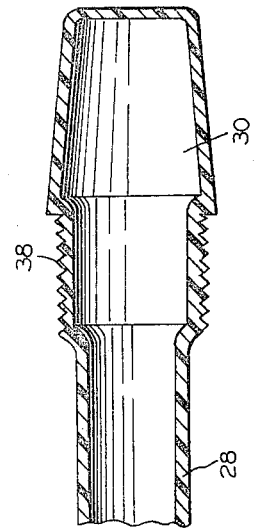
Figure 2:
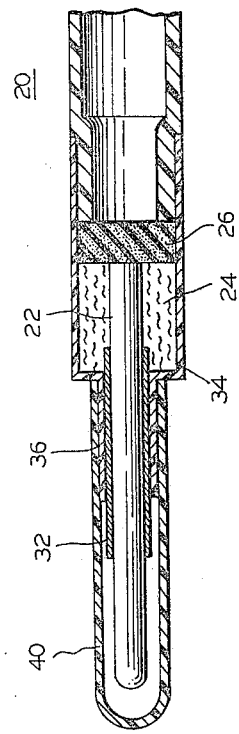

The invention will become more readily apparent from the following detailed description taken in conjunction with the accompanying drawings in which:

FIGURE 1 is a longitudinal sectional view of a writing instrument constructed in accordance with the principles of the invention; and FIGURE 2 is a view similar to FIGURE 1 but illustrating a spare assembly of pen tip and ink cartridge for use in the writing instrument shown in FIGURE 1.

Referring now to FIGURE 1 of the drawing, it is seen that a writing instrument disclosed herein comprises a hollow pen holder member generally designated by the reference numeral 10, and an assembly of pen tip and ink cartridge generally designated by the reference numeral 20 and fitted into the holder member 10. The pen holder member 10 includes a first or front holder portion 12 and a second or rear holder portion 14 integral therewith. The front holder portion 12 may be of any suitable configuration such as a circular or hexagonal cylinder and has a front end portion tapered to terminate in a flat surface substantially normal to the longitudinal axis of the instrument. The rear holder portion corresponds in configuration to and is somewhat greater in outside diameter than the front holder portion.

The holder member 10 has a stepped hole centrally extending throughout the same and divided into three portions i.e. front, middle and rear portions different in diameter from one another and having two shoulders therebetween. The front hole portion has a vent aperture 16 extending through the wall of the front holder portion 12 as in the conventional writing instruments. The rear hole portion is internally screw threaded at 18 for a purpose which will be apparent hereinafter.

The pen holder member 10 may be of any suitable synthetic resin and preferably of acrylonitrile-butadien-styrene copolymer.

According to the principles of the invention, the assembly of pen tip and ink cartridge 20 is detachably fitted into the hollow holder member 10 such that the associated pen tip on one end of the assembly slightly projects beyond the tapered end of the holder member 10 while the other end of the assembly closes the rear end of the holder member 10.

As shown in FIGURES 1 and 2, the assembly of the pen tip and ink cartridge is a unitary structure and comprises a pen tip 22 in the form of a thin rod similar to a pencil lead, a secondary ink bearing member 24, a primary ink bearing member 26, an ink reservoir 28 and a tail plug 30 in the named order starting with the one end of the assembly.

The pen tip 22 is of a well known capillary structure including a bundle of any suitable synthetic resinous fibers and has a reinforcing sleeve 32 of any suitable metal such as aluminum encircling the intermediate portion thereof with the rear end portion extending into the secondary ink bearing member 24. The pen tip 22 may be prepared as by coating lengths of any suitable resinous fibers with a dilute solution of any suitable binder and heating the bundle to fix the lengths of fibers. The secondary and primary ink bearing members 24 and 26 along with the adjacent portions of the reinforcing sleeve 32 and the ink reservoir 28 are disposed in a tip holder 34 in the form of a stepped tube made of any suitable synthetic resin such as acrylonitrile-butadiene-styrene copolymer. More specifically, the tip holder 34 has a reduced hollow portion 36 snugly fitted onto the reinforcing sleeve 32 and the other end portion or the rear portion having the reduced end portion of the reservoir 28 snugly fitted thereinto. Thus the rear portion of the pen tip 22, the secondary ink bearing member 24, the primary ink bearing member 26, and the reduced end of the reservoir 28 are disposed in contacting relationship in the tip holder 34.

The primary ink bearing member 26 may be of any suitable synthetic resin or rubber such as foamed polyvinyl formal having a multiplicity of continuous mirco-voids longitudinally extending therethrough. The secondary ink bearing member 24 may be of any suitable synthetic resinous fibers such as polyester fibers longitudinally arranged into a bundle to form therebetween a multiplicity of capillary tubes extending throughout its length.

The ink reservoir 28 may be of any suitable synthetic resin such as polypropylene. Also, the ink reservoir 28 is closed at one end thereof remote from the tip holder 34 and open at the other end which is in contact with the primary ink bearing member 26 whereby ink in the reservoir 28 is adapted to be supplied to the primary ink bearing member 26 through the said opened end.

The assembly 20 has a screw threaded surface 38 at a position corresponding to the internally screw threaded surface 18 of the holder.

As shown in FIGURE 2, a protective cap 40 is snugly fitted onto the one end portion of the assembly including the pen tip 22 in order to prevent evaporation of ink, and contamination of and damage to the tip when it is stored. The cap 40 may be of any suitable synthetic resin such as acrylonitrile-butadiene-styrene copolymer.

With the cap 40 removed from the assembly 20 the latter is fitted into the hollow holder member 10 by having the externally screw threaded surface of the assembly engaged by the internally screw threaded surface of the holder.

Under these circumstances, it will be seen that the pen tip 22 snugly extends through the front hole portion and slightly projects beyond the tapered front end of the holder member 10 with the reinforcing sleeve 32 and the tip holder 34 abutting against the associated shoulder as previously described.

The tail plug 30 of the assembly 20 merges into the adjacent portion of the holder member 10 to close the end thereof.

In the writing instrument thus for described, an amount of ink is supplied from the reservoir 28 to the primary ink bearing member 26 through the opened end surface of the reservoir to saturate the latter. Then the secondary ink bearing member 24 is fed with that portion of ink maintained in its saturated state in the primary ink bearing member 26 until all the longitudinal capillary tubes in the secondary member are entirely filled with ink but it is prevented from being excessively supplied with the ink. Succeedingly the ink flows slowly out from the secondary ink bearing member 24 into the pen tip 22 to fill the capillary tubes in the latter. As the amount of ink in the pen tip 22 decreases during a writing operation, the ink stored in the reservoir 28 will compensate for this decrease in amount of ink retained in the pen tip with the result that the components 22 through 28 are maintained in their optimum state under which they are filled with ink. In other words, the pen tip 22 always has therein ink in an amount controlled by the primary and secondary ink bearing members 26 and 24.

On the other hand, the pen tip 22 extends through the front hole portion without any play while the assembly 20 is maintained in place within the holder member 10 through their connection 38. Therefore one can hold the rear holder portion 14 by his or her fingers to properly and continuously perform a writing operation while the pen tip 22 is entirely prevented from shaking and withdrawing into the holder member 10.

If the tail plug 30 of the assembly 20 is substantially transparent, the amount of ink still stored in the reservoir 28 can be instantaneously and externally observed. After it has been seen that the ink in the reservoir is used up, one can replace the empty assembly by a fresh one through single manipulation without contamination of his or her hand. That is, he or she can hold the tail plug of the assembly by his or her fingers and disengage the assembly from the holder mmeber. Then a fresh assembly is manually fitted into the holder member and fixed therein by engaging the screw threaded surface of the assembly with the corresponding surface of the holder member. From the foregoing, it will be appreciated that the invention has provided a writing instrument giving long service and requiring only exchanging an assembly of a pen tip and ink reservoir as long as the associated holder member is not damaged.

While the invention has been illustrated and described in conjunction with a single preferred embodiment thereof it is to be understood that various changes in the details of construction and the arrangement and combination of parts may be restorted to without departing from the spirit and the scope of the invention. For example, the assembly may be operatively connected to the hollow holder member through any suitable close fitting other than screw threaded engagement as previously described.

What I claim is:

1. A writing instrument comprising a hollow pen holder having a hole therethrough with at least one shoulder therein, and an assembly of a pen tip and ink reservoir detachably fitted into said hole, said assembly being of a unitary structure and including a thin rod-shaped pen tip, a tip holder holding said pen tip and an ink reservoir mounted on the tip holder, said tip holder having capillary means disposed therein between said pen tip and said ink reservoir and contacting said pen tip and ink reservoir for controlling the amount of ink supplied from said reservoir to said pen tip, the assembly having at least one shoulder thereon and fitting in place within the hollow holder member with said pen tip projecting slightly beyond one end of said holder member, said ink reservoir having one end portion extending slightly out of the other end of said holder member and closing said other end, and said shoulders abutting, and said holder having internal securing means therein and said assembly having external securing means thereon mating with said internal securing means fit securing said assembly in position in said holder.

References Cited

UNITED STATES PATENTS

| 3,048,879 | 8/1962  | Rosenthal | 401—199 |
| 3,356,095 | 12/1967 | Tylle     | 401—134 |
| 3,418,056 | 12/1968 | Derbins   | 401—190 |

FOREIGN PATENTS

| 6,609,313 | 1/1967 | Netherlands. |
| 1,436,956 | 5/1965 | France.      |
| 1,250,302 | 9/1967 | Germany.     |

LAWRENCE CHARLES, Primary Examiner

U.S. Cl. X.R.

401—132